United States Patent [19]

Trice, Jr.

[11] 4,111,564

[45] Sep. 5, 1978

[54] REFERENCE PLANE PRODUCTION

[76] Inventor: James R. Trice, Jr., 824 S. Glebe Rd., Arlington, Va. 22204

[21] Appl. No.: 330,599

[22] Filed: Feb. 8, 1973

[51] Int. Cl.² .......................... G01C 5/00; G01B 11/26
[52] U.S. Cl. .................................. 356/247; 356/153; 356/172
[58] Field of Search ............... 356/138, 153, 172, 247; 331/94.5 A, 94.5 C; 350/302, 293, 7; 33/DIG. 21

[56] References Cited

U.S. PATENT DOCUMENTS

| 543,730 | 7/1895 | Heap | 362/280 |
|---|---|---|---|
| 2,528,590 | 11/1950 | Garlow | 350/302 |
| 3,189,744 | 6/1965 | Ogland | 350/293 UX |
| 3,253,138 | 5/1966 | Nagel | 240/11.2 |
| 3,393,321 | 7/1968 | Frungel | 250/573 |
| 3,426,144 | 2/1969 | Roth | 350/7 UX |
| 3,452,207 | 6/1969 | Tsukkerman | 250/215 |
| 3,469,919 | 9/1969 | Zellner | 331/94.5 A |
| 3,471,234 | 10/1969 | Studebaker | 331/94.5 A |
| 3,485,546 | 12/1969 | Roth | 350/7 |
| 3,582,214 | 6/1971 | Loomis | 356/172 |
| 3,609,584 | 9/1971 | Stitch | 331/94.5 |
| 3,634,675 | 1/1972 | Madsen et al. | 240/1.2 |
| 3,820,903 | 6/1974 | Kindl et al. | 356/138 |

OTHER PUBLICATIONS

"Progress in Optics, vol. I" edited by Wolf; North Holland Pub. Co., Amsterdam; 1961, pp. 316-318.

*Primary Examiner*—Vincent P. McGraw
*Attorney, Agent, or Firm*—McGarry & Waters

[57] ABSTRACT

A reference plane producing method and system wherein a substantially collimated beam of electromagnetic radiation, for example, a laser beam, is reflected to simultaneously disperse the beam in different directions to form a thin plane of such radiation which can be used, for example, as a construction reference line. In a preferred embodiment a primary cone having its apex projecting towards the incident beam and its optical axis coaxial with the incident beam is used to reflect the beam of light. Various embodiments of a basic apparatus having integral or separate collimating and leveling devices are described. The preferred source of radiant energy is a laser, most preferably a second-mode laser having a donut or annular shaped beam and is projected against an axially aligned conical reflecting surface. The conical surface can be a female cone formed by axially drilling into a transparent transmission tube, such as the emission end of a fiber-optic transmission system.

40 Claims, 20 Drawing Figures

U.S. Patent  Sept. 5, 1978  Sheet 1 of 4  4,111,564
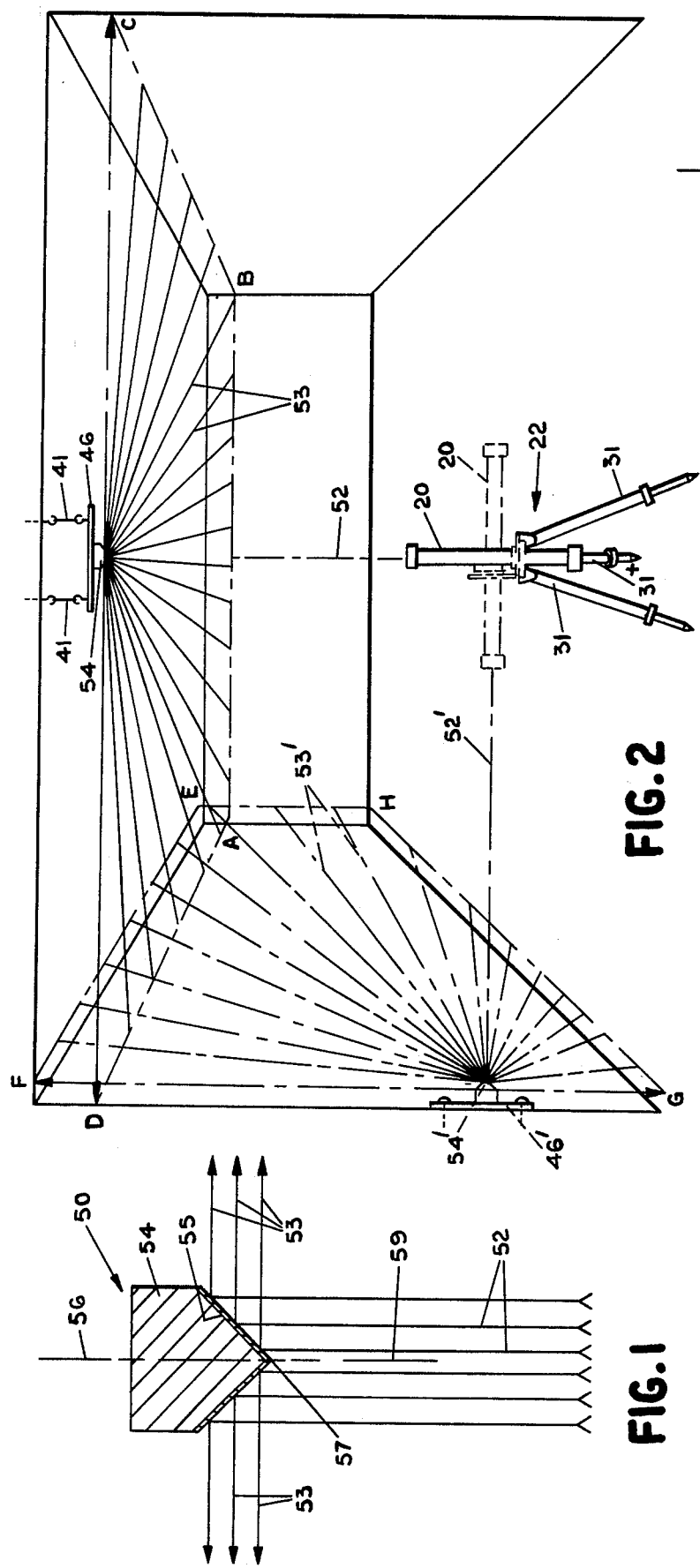
FIG.2
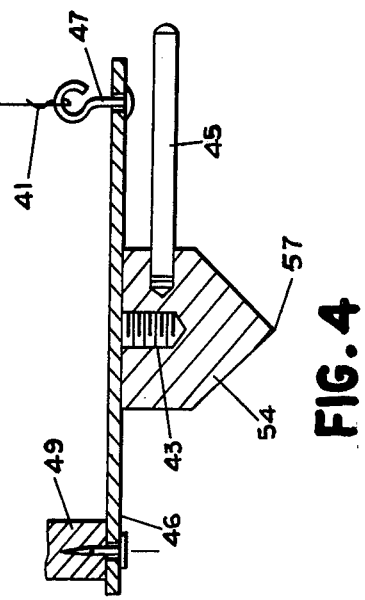
FIG.4
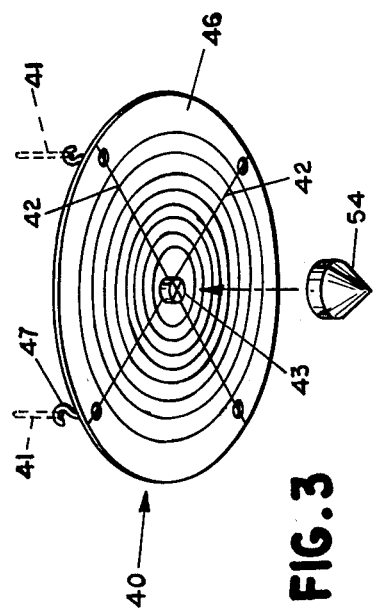
FIG.3
FIG.1

REFERENCE PLANE PRODUCTION

BACKGROUND OF THE INVENTION

1. Field of the Invention

This invention relates to generation of a radially extending plane of electromagnetic radiation from a beam source of electromagnetic radiation. In one of its aspects the invention relates to a method and apparatus for converting a coherent beam of visible light, preferably laser light, into a radially extending plane. In another of its aspects, the invention relates to a construction tool for projecting a uniform plane of light for use as a reference line.

2. State of the Prior Art

In the construction industry, narrow beams of collimated light in the form of laser beams are being increasingly used in connection with establishing and marking long, straight, level lines, such as those required for markings for ceilings or floors, or long, straight, vertically spaced-apart lines, such as those required at the top and bottom of curtain walls and the like. Laser beams are also becoming widely used for installing large, heavy machinery where precise alignment is vital, such as fourdrinier machines in the paper industry.

U.S. Pat. No. 3,588,249 to Studebaker discloses a survey apparatus in which a laser beam generator is mounted vertically on a tripod and projects a beam of light upwardly. A pentaprism is rotatably mounted above the generator to receive the beam and to direct the beam in a direction 90° from its source. The pentaprism is rotated about the axis of the incident beam so that the reflected light is rotated about a circle like a beacon. The apparatus is used to simulate a plane of light as the reflected beam is rotated.

However, the laser generator, mounted on a tripod, is difficult to align in vertical fashion and the tripod does not maintain its aligned position over extended periods of time. Frequently, the simulated reference plane thus changes its orientation after it has been properly aligned. Further, the mechanism for rotating the pentaprism introduces vibrations into the reflected beam which result in slight deviations in the beam as it rotates and tends to introduce inaccuracies into the reference line. Still further, the intensity of the beam is such and the flashing light due to rotation causes eye strain for the viewer. The apparatus is expensive in that it must be precisely constructed and requires expensive components.

U.S. Pat. No. 3,656,828 to Scholdstrom discloses a light signal apparatus wherein a laser beam is split into two oppositely directed beams which are slightly off an axis of rotation for the two beams. An observer looking toward the source detects a null point between the two beams as a plane normal to the axis of rotation. Many of the same problems of the Studebaker system are inherent in the Scholdstrom system except, perhaps, the eye strain may be somewhat lessened.

SUMMARY OF THE INVENTION

According to the invention a beam of electromagnetic radiation is dispersed into a useful reference plane by reflecting the beam from a surface which simultaneously disperses the beam in different directions into a locus of points arrayed in a coherent and useful reference plane at a distance from the beam source. Desirably, the beam is a laser beam which is generated from a suitable source mounted in a holder which includes leveling means, and the reflecting surface is a conical surface, preferably a right angle cone, whose optical axis is aligned with the axis of the laser beam. The cone is coated with a mirror surface for optimum reflectance although conceivably the mirror coating could be eliminated if the cone material has sufficient reflectivity for the desired use.

The laser generator is desirably of the donut mode type (TEM01*) which generates in cross section a hollow or donut shaped laser beam, or can be a multi mode beam. When such a beam is used, the cone need be only a truncated cone which will disperse the light more uniformly in the plane.

The beam generator can be mounted vertically or horizontally or at any angle with respect to the horizontal. After the generator and reflecting surface are set in properly aligned position, the reference plane is generated without any moving parts. The apparatus is rugged in construction and requires no further adjustments or settings after the original set up. The reference plane, thus produced, is a stable, narrow fixed reference plane useful for establishing datum planes on ceilings, floors, and walls within a building, and for guiding construction equipment, monitoring and inspection of tubular systems, and surveillance applications. The reference plane can be used in any application where a datum plane of any orientation is desired.

The reflecting surface can be rigidly mounted in a housing properly aligned with the laser generator or can be separately mounted for alignment at the point of use. In any case, the apparatus is quickly set at the proper location and remains firmly fixed as long as desired. Because the intensity of the plane is uniform and constant at a given distance from the reflecting surface, eyestrain resulting from use of the plane is minimal.

In one embodiment, the reflecting surface comprises the concave conical surface of an end of a fiber-optic tube having a conical cavity formed therein. In another embodiment means are provided for focusing the plane at a given distance, such means including a concave conical reflecting surface whose radius of concavity is adjustable. In another aspect, a conical plane of light is generated with a pair of conical reflecting surfaces which are selectively movable with respect to each other.

In some cases, the reference plane is detected at a selected distance. The detection of the reference plane can be by eye, sighting such at the reflecting surface, by observing the impingement of the plane on a target, or by photo electrically sensing the position of the plane.

BRIEF DESCRIPTION OF THE DRAWINGS

The invention will now be described with reference to the accompanying drawings in which:

FIG. 1 is a cross-sectional view of a reference plane conversion means in the form of a conical reflecting means having 45° reflecting surfaces, in which a beam of collimated radiant energy is reflected perpendicularly, thereby converting the beam into a plane of radiant energy.

FIG. 2 is a perspective view showing an apparatus of the invention which is set up in a room for establishing horizontal planes of reference on the walls thereof, and, in phantom, vertical planes of reference on the floor and ceilings thereof.

FIG. 3 is an exploded perspective view of the reference plane producing means and support means used in the apparatus of FIG. 2.

FIG. 4 is a cross-sectional view of the reference plane conversion means and support means used in the apparatus of FIG. 2 for slightly differing attachment means.

FIG. 9b is a graphic representation of light intensity across line "a" for the first-mode or standard laser beam illustrated in FIG. 9a.

FIG. 10b is a graphic representation of light intensity across line "b" for the second-mode laser beam illustrated in FIG. 10a.

DESCRIPTION OF THE INVENTION

Figure 6:
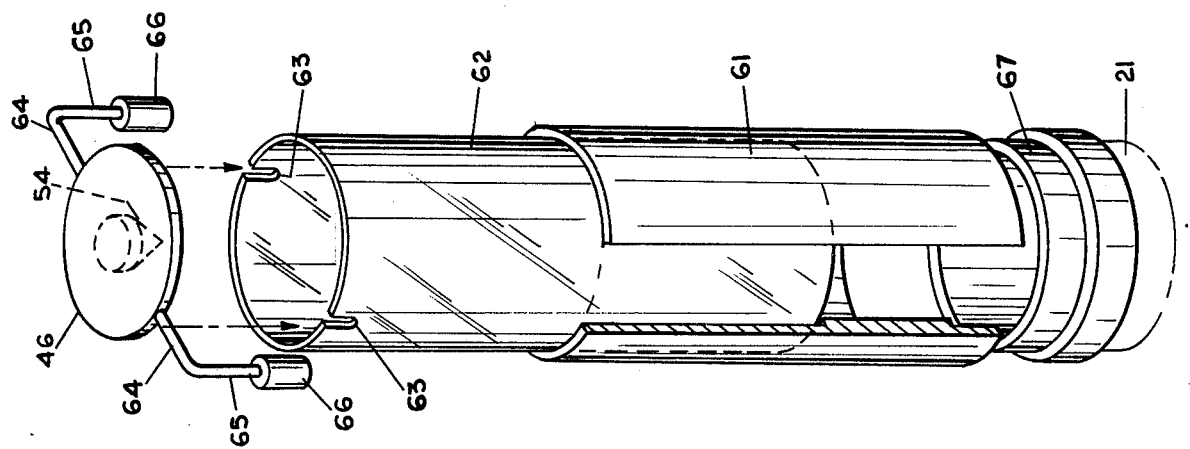
FIG. 6 is a perspective view of an upright tube, useful for housing the radiant-energy source, and a self-leveling reference plane conversion assembly.

Referring now to the drawings, and to FIG. 1 in particular, a reference plane reflector 50 comprises a 45° reflecting cone 54 having an axis 56 through apex 57 aligned with the axis 59 of a narrow beam 52 of light. This cone 54 has a first-degree reflecting surface 55. When a light beam 52 impinges upon the surface 55, the beam 52 is reflected simultaneously in different directions into a thin radially projecting reference plane 53. The thickness of the reference plane thus produced is desirably in range of 1/16 inch to ¼ inch although thicknesses up to 1 inch can be employed. The plane of reflected light 53 eminates with substantial uniformity at a 90° angle from the incident beam 52.

The light beam 52 can possess any desired frequency along the electromagnetic spectrum, but the most commonly used frequencies are those of visible light. For most uses, the beam should also be relatively narrow in diameter, collimated and reasonably monochromatic, particularly if the beam is needed for exacting scientific work or must be projected through a considerable distance. For building construction, tunnel boring, equipment installation, and the like, it is generally much preferred to use laser light because a beam of high intensity can be obtained from a compact and rugged laser unit. The present invention is therefore described with specific reference to the use of a laser light beam source and a laser light beam emitted thereby, although other forms of high intensity collimated light or electrogenetic radiation can also be used in accordance with the invention. The width or diameter of the beam, however, should be sufficiently narrow to produce a useful reference plane. Beam diameters less than two inches and preferably less than one inch are preferred in certain cases.

While the specific form of laser light beam source which is employed is immaterial, a helium-neon gas laser is suitable for use in the invention. The laser-type beam emitted by this type of laser has radiation in the visible red portion of the spectrum, and is safe, easy to use, and a simple form of laser beam projection.

Figure 5:
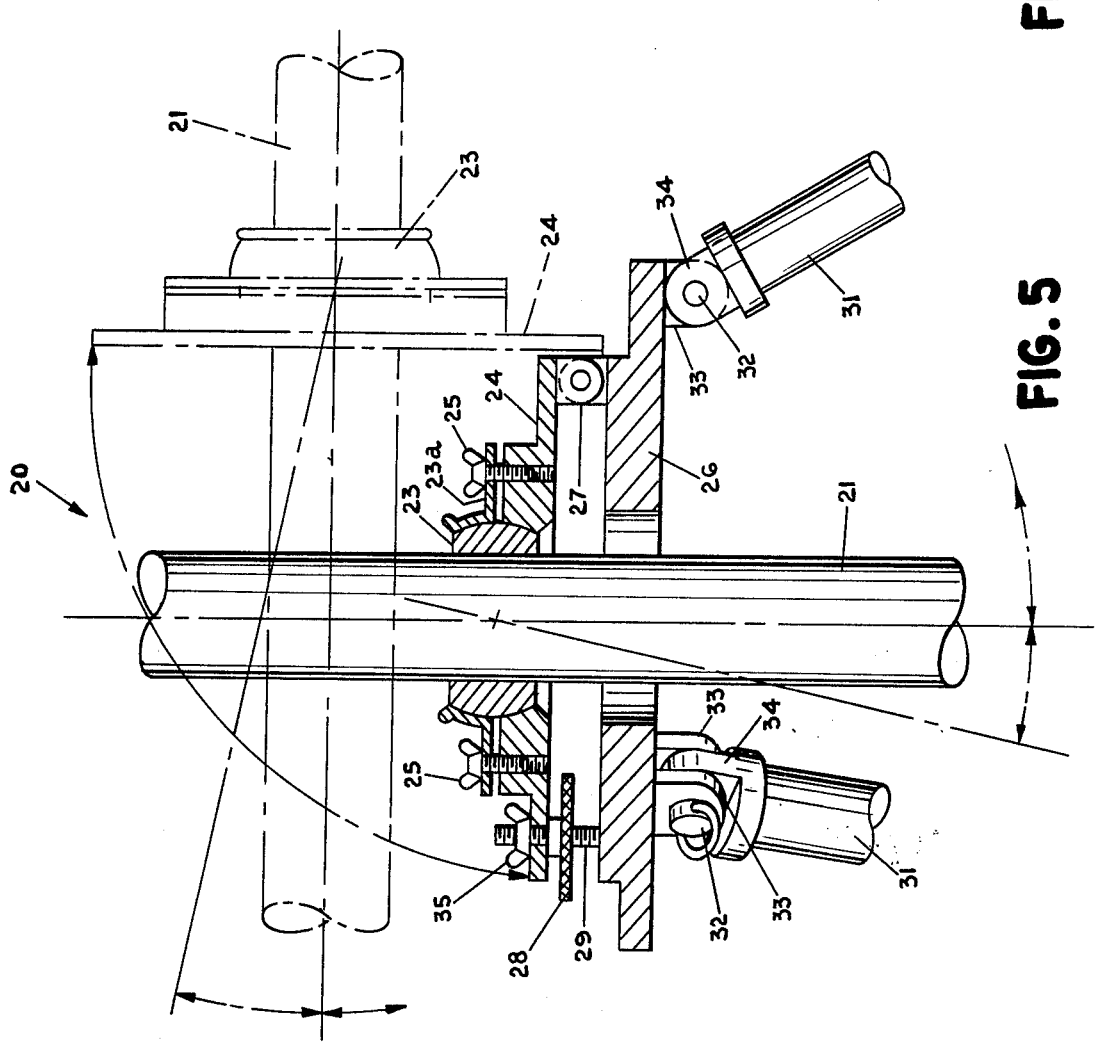
FIG. 5 is a cross-sectional view of the tripod mounting for the radiant-energy source means used in the apparatus of FIG. 2.

As illustrated in FIG. 2 and in greater detail in FIGS. 3, 4 and 5, a laser light beam generator or laser tube 21 is provided with a supporting annular collar 23 secured thereto midway along its length. The laser tube 20 extends through a central opening of collar 23, which has an outwardly directed flange 23a rotatably mounting bolts 25. Support plate 24 has vertically tapped holes which threadably receive bolts 25 for securing the collar 23 thereto. The outer surface of the collar 23 is movably mounted in the inner surface of the opening of support plate 24 forming a ball-and-socket joint. Adjusting the plurality of leveling bolts 25 adjusts the vertical position of the laser tube 20. The laser tube mounting assembly described above is mounted on a tripod 22 comprising a tripod plate 26 and a plurality of legs 31 rotatably mounted thereto by pins 32 through conventional clevis mountings including depending lugs 33 and projecting lug 34.

The leveling plate 24 is supported on tripod plate 26 through a hinge 27 and by adjusting bolt 29 extending from an uppermost surface of the tripod plate 26. By adjusting the knurled nut 28 on bolt 29, the leveling plate 24 can be adjusted to a horizontal position along the axis of hinge 27. The adjustment can then be set by tightening the top wing nut 35.

It should be understood, of course, that the specific detailed construction of the tripod support for the laser tube 20 does not, per se, form a part of the present invention and the construction illustrated in the drawings is shown only primarily for the purpose of illustration. Many features in surveyor's levels, theodolites (transits), etc., may be employed. In particular, a pair of cross levels (not shown) disposed at right angles to each other on the upper surface of leveling plate 24, with vernier gauges and adjustments, desirably are provided for leveling plate 24 for setting the laser tube 21 at a predetermined angle.

As illustrated in full lines in FIGS. 2 and 5, the laser tube 20 may be mounted in a vertical position in its tripod support. However, as shown in phantom lines in FIGS. 2 and 5, the laser tube may be supported in a horizontal position by removing locking wing nuts 35 and rotating the leveling plate 24 around hinge 27 to that it is in a vertical position. This rotation of the leveling plate 24 to a vertical position can be effected after the laser tube 20 has been removed from the central opening therein by removing adjusting screws 25. After the leveling plate 24 is in vertical position, the laser tube 20 may be reinserted through the central opening and adjusted so as to be perpendicular to the now vertical plate 24 or at any desired angle thereto by replacing and retightening of the adjusting and retaining screws 25.

As illustrated in FIG. 2, when the apparatus is to be used to define a horizontal line, such as those required for a ceiling, the laser tube 20 is mounted in a vertical position conveniently at approximately the center of the room in which the suspended ceiling is to be installed. A target plate 46 is hung from suitable overhead supports such as the bottom of the floor above, overhead pipes, or a wooden subdecking or other suitable existing overhead structure, by adjustable hangers 41 attached to eyebolts 47.

As illustrated in FIG. 3, the target plate 46 may conveniently be in the form of a circular disc having crosslines or crosshairs 42 on its lower surface. A central threaded stud 43 projects from the bottom of target plate 46 and reflecting cone 54 may be screwed thereon. The crosshairs or crosslines 42 preferably are continued on the bottom of stud 43 so that the center of the stud 43, and thus the apex of the cone 54, when it is threaded onto the stud, is in axial alignment with the central axis of the laser beam 52. The target plate 46 is leveled by adjusting the adjustable hanging rods or bolts 41 with the aid of suitable levels (now shown).

In FIG. 3, the target plate is shown as nailed to an existing higher wooden structure, such as a wooden subdecking 49 at one point, and, at other points, is supported by adjustable hanging rods 41. As illustrated in this figure, the cone 54 may be provided with a removable handle 45 adapted to fit in a hole bored in the side of the cylindrical base of cone 54 so as to aid in tightening the cone on the stud 43.

As previously stated, the apex of the cone 54 extends towards the laser tube 20 and the optical axis of the cone 54 is the same as the central axis of the laser beam 52. The conical surface of the cone is provided with a first-degree mirror surface so that the vertical laser beam 52 is reflected by the cone 54 in the form of a thin reference plane 53 of light which is perpendicular to the laser beam 52 and is, thus, a horizontal plane. As this plane 53 of light meets the walls of the room, it visibly appears as a thin line of light on each wall, i.e., lines indicated in FIG. 1 as A-B, B-C, C-D, and A-D. Workmen on ladders or suitable scaffolding can use the lines directly as reference lines or can mark these lines permanently on the respective walls using a straight edge or by snapping a chalk line, or other suitable means. In addition one can measure up or down from these reference lines to any given position on the wall. It can be seen from the drawings that anywhere the reference plane 53 is intercepted a horizontal reference line would be created on the intercepting target, and that reference line would always fall in reference plane 53.

When it is desired to provide a vertical plane of light so as to establish and mark vertically spaced lines for a curtain wall, for example, the operation of the device is essentially analogous. The laser tube 20 is mounted in a horizontal position as shown in phantom lines in FIG. 2, and a target plate 46' with a convex reflecting cone 54' is mounted on a suitable existing or temporary supporting structure, so that the target plate 46' is vertical and is in alignment with the desired alignment of the wall as shown to the left in FIG. 2. The horizontal laser beam 52' impinging on the convex reflecting cone 54' is reflected in the form of a vertical plane 53' and appears as line E-F on the ceiling and line G-H on the floor, on which the tripod 22 is mounted, and as line E-H on one wall and line F-G on the other wall, if any.

It is apparent that, in the construction so far described, independent leveling and positioning of the laser tube 20 and the target plate 46 and, thus, the conical reflector 54 mounted thereon is necessary. However, it is practical to provide a self-leveling mounting for the target plate 46 (and conical reflector 54 thereon) and the laser tube 20 so that only a single accurate set-up and leveling is necessary.

An exemplary self-leveling target apparatus is illustrated in FIG. 6, wherein the laser tube 20 is provided with an annular collar 67 on which a main support tube 61 is mounted. An adjustable tube or chimney 62 of transparent material, such as glass or transparent plastic, e.g., an acrylate, such as plexiglass, or other sturdy transparent plastic, is mounted on top of the tube 61 and is provided at its top edge with slots 63 rounded at the bottom and adapted to receive lugs 64 extending from target plate 46. The lugs 64 have downwardly extending arms 65 on the end of which are affixed weights 66. The several parts are shown slightly spaced apart in the drawings for the purpose of better illustration and should be accurately machined and constructed so that when the laser tube 20 is made vertical, the tube 61 mounted thereon will also be vertical as will be the transparent tube 62. The target plate 46 will thus be level on the axis through the lugs 64, and the weights 66 will cause it to swing in the slots 63 so that the target plate 46 is also level on its axis perpendicular to the axis of lugs 64. Thus, the axis of reflecting cone 54 is vertical. The laser beam emitted by tube 20 is thereby directed in a vertical direction so that, as it hits the apex of cone 54, the first-degree mirror on the conical surface 55 of the reflecting cone 54 will reflect the laser light beam 52 as a horizontal plane 53.

Figure 7:
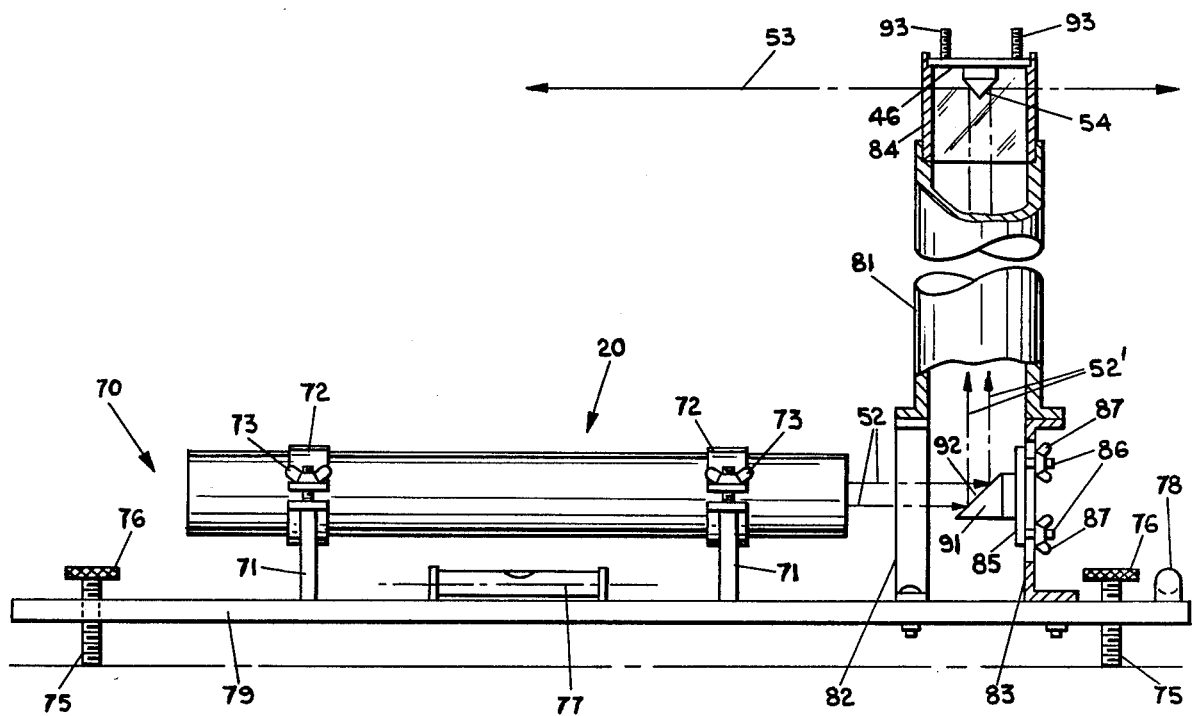
FIG. 7 is a side elevational view of an integrally mounted and fixedly adjusted assembly combining a beam-emission source and a reference plane conversion means.

A simplified form of integral mounting for the laser tube 20 and reflector cone 54 is illustrated in FIG. 7, wherein the laser tube 20 is mounted on a suitable base plate 79 by legs 71 on which the laser tube is held so as to be parallel with the base by split collars 72 fastened to legs 71 by wing nuts 73 on the threaded top portion of the legs 71. The base 79 is provided with a leveling screw 75 near each of the four corners thereof and by rotation of the knurled knobs 76 on the top of each of the leveling screws, the base 79 may be leveled by reference to the level 77, mounted on and extending longitudinally on the base plate 79, and the level 78 extending transversely of the base plate 79 on a line at right angles to the line of the axis of level 77. The base plate 79 and thus the laser tube 20 are made level so that a horizontal beam is emitted by the laser tube 20.

A vertical tube 81 extends upwardly from base plate 79 and is secured by supports 82 and 83. A transparent tube or chimney 84 is mounted on top of tube 81 and mounts target plate 46 having the reflector cone 54 depending therefrom. A vertical plate 85 is attached to support 83 by bolts 86 and wing bolts 86 and wing nuts 87 thereon. In the center of plate 85 is mounted a plane mirror 91, the reflecting surface 92 of which is mounted at a 45° angle from the vertical so that the horizontal laser beam 52 emitted by laser tube 20 is reflected in a vertical direction as beam 52′ and impinges on the apex of cone 54 to produce the horizontal reference plane 53 which projects through the transparent tube or chimney 84.

If it is desired to obtain the reflected plane 53 of light as a vertical plane, then, in the construction shown in FIG. 7, the tube 81 is removed from supports 82 and 83, and the plate 85 is removed from support 83 by loosening wing nuts 87 on bolts 86. The target plate 46, having reflecting cone 54 mounted thereon, is removed from tube 84 and from tube 81, and then mounted on support 83, in place of plate 85. The target plate 46 is secured on the support 83 by tightening wing nuts 86 on the threaded studs 93 shown projecting from the top of target plate 46. When the apparatus is arranged in this manner, the horizontal laser beam 52 from laser tube 20 impinges on the cone 54, the axis of which is now horizontal and coincides with the central axis of the beam 52 so that the beam is reflected therefrom as a vertical plane. If desired, slots or openings may be provided in the base 79 directly beneath the cone 54 when the target plate 46 is mounted on support 83 so as to cut down the "shadow" beneath the base 79. However, ordinarily this is not necessary since the blank created in the line in which the vertical plane of laser light appears on the floor can ordinarily be filled in by use of a straight edge or by snapping a chalk line.

It is apparent that the base 79 of the apparatus illustrated in FIG. 7 may be supported from the floor by the leveling screws 75 thereon and the desired height for a horizontal plane of light may be obtained by use of a tube 81 of the necessary height. The tube 81, if desired, can be made so as to have a telescoping construction so that its length may be adjusted. However, in order to avoid a tube 81 of undue length which might magnify any errors in inaccurate setting of the apparatus, it is preferred to obtain the desired height for the reflecting cone 54 and, thus, the horizontal plane of light reflected therefrom by supporting the base 79 through the leveling screws 75 thereon, on a suitable elevated structure, such as a scaffold or saw-horse or other suitable temporary elevating structure.

Figure 8:
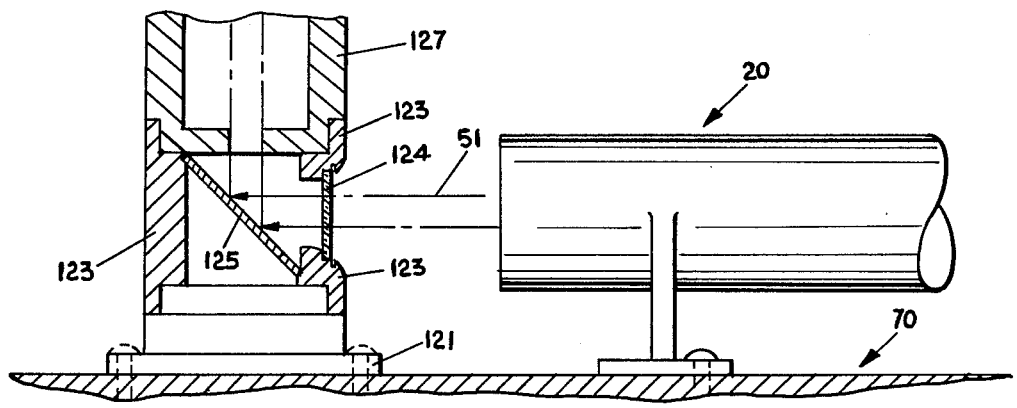
FIG. 8 is a side elevational view, partly in cross-section, of another assembly having a separate collimation means for the emitted beam of electromagnetic radiation.

The laser tube 20 frequently has a collimating system built into the tube. In FIG. 8, an apparatus similar to that shown in FIG. 7 has a separate expanding and collimating system for the laser beam mounted in an upright cone support 120. Specifically, the laser tube 20 is mounted on a support 70 and projects a laser beam 51 against a 45° mirror which reflects the beam upwardly through expanding line 131 and collimating lens 132 as beam 52 and onto the reflector 50. The mirror 125, is supported in a housing 123 which is secured to the support 70 through suitable fastening means 121. The lenses 131 and 132 are supported in upright column 127 mounted on the housing 123. A transparent annular cylinder 136 is mounted on top of the column 127 to permit passage of the reference plane 53 therethrough and to support the target plate 46 thereon through a support plate 138. The lenses 131 and 132 are mounted in an annular holder 134 which slides into the column 127. The lenses 131 and 132 can be moved within the column 127 to focus the beam 52 and focus the reflected plane at a given distance from the reflector 50. To this end a set screw 133 can be provided to fix the expanding and collimating lenses in adjusted position.

In some cases, the intensity of the reference plane of light will be somewhat less than desirable due to the intensity of background light, size of the room, intensity of the generated beam, etc. In such cases, the visibility of the reference plane can be enhanced by coating the walls with a strip of material which will develop color or a mark when subjected to a laser beam. The reference plane will be visible from the color or mark so that manual marking of the lines is not necessary.

The strip of material which will develop color when acted on by laser light is applied to the walls of the room illustrated in FIG. 2 at approximately the height where a reference line is needed. The precise line can be developed in the form of a marking by action of the laser light. The strip of material can be about a foot wide, for example. One means of accomplishing this is to apply to the walls a strip of paper or another suitable substrate such as diazo type papers, having on its surface a coating of material which is sensitive to laser light and will develop color when acted on by laser light. In place of using a paper strip having a preformed coating thereon, a paint containing the encapsulated color forming materials may be applied to the walls in approximately the area overlapping that where a reference line is needed.

Figure 9A:
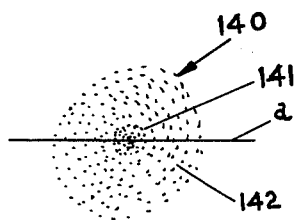
FIG. 9a is a schematic representation of a cross-section of a standard first mode of a laser beam.
Figure 9B:
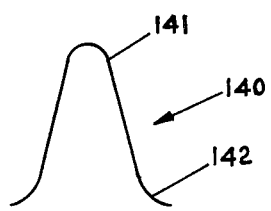
Figure 10A:
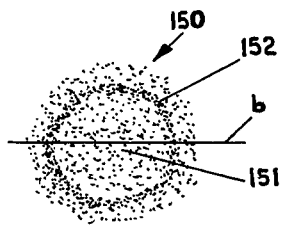
FIG. 10a is a schematic representation of a cross-section of a donut-mode laser beam.
Figure 10B:
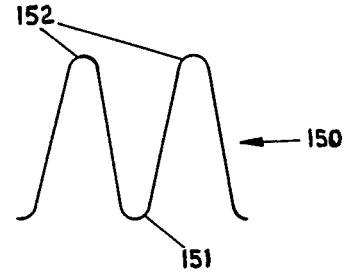
Figure 11:
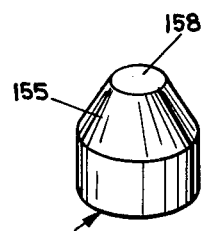
FIG. 11 is a perspective view of a truncated cone which is especially suitable to receive a second-mode laser beam.

The preferable mode of the laser beam is the so-called donut mode or TEM01* laser beam. The difference between the first mode or conventional mode and the donut mode is illustrated in FIGS. 9a, 10a and 10b to which reference is now made. As mentioned above, FIGS. 9b and 10b are graphic representations of the intensity of light across lens "a" and "b" of FIGS. 9a and 9b, respectively. As shown in FIGS. 9a and 9b, an ordinary laser light beam 140 has a high intensity center 141 which is surrounded by a rapidly diminishing zone of intensity 142. In contrast to this first-mode laser beam, a donut-mode laser beam 150 has a central area 151 having a relatively low light concentration which is surrounded by an annular zone 152 of high light intensity so that the cross section shown in FIG. 10a has the appearance of a donut. In combination with a donut-mode laser beam, the truncated cone 154 which is shown in FIG. 11 is highly useful. The straight conical central portion 158 thus coincides with the central zone 151 having low light intensity, and the reflective conical surface 155 thus coincides with the high-intensity annular zone 152 having high light intensity.

A donut-mode or TEM01* laser beam 150 is a highly preferred source of electromagnetic radiation, particularly because it is an extremely difficult operation to manufacture a cone having a precisely polished apex which is free of ripples and other surface distortions capable of introducing major irregularities into a reflective plane after thousand-fold magnification. The upper portions of the core are easier to polish to a smoothness to substantially eliminate irregularities in the reference plane. Thus, the second-mode laser beam compliments technical problems associated with the making of optically perfect reflecting cones. The second-mode laser beam can be used with full or truncated cones to produce the reference plane. The second-mode laser beam is of higher intensity for a given wattage. Therefore the intensity of the resulting reference plane will be greater with the second-mode laser beam.

Figure 12:
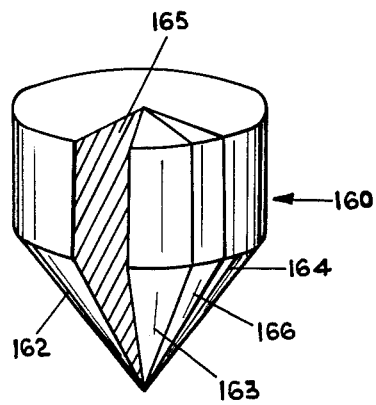
FIG. 12 is a perspective view of a cone having a slice or sector removed and another sector which is not coated, whereby direction of planar reflectance is selectively controlled.

Another type of preferred laser system is the so-called multimode laser generator which produces a larger diameter laser beam than the first mode (FIGS. 9a, 9b). The multimode is similar in width to the second mode laser system except that the intensity of the beam is substantially uniform across the diameter of the beam. Reference is now made to FIG. 12 showing a cone 160 made of a plurality of sections. The cone is a practical device according to the spirit of this invention for enabling selected sections of a cone to be directed toward areas of need without reflections into areas where unwanted. Two methods of such selective illuminations are shown in FIG. 12. The cone 160 has reflecting conical surface portions 162, 163, 164. A sector or slice has been physically removed at 165 from the cone 160 so that there is a vacancy, thereby eliminating the light from a portion of the reflected reference plane. Similarly, non-reflectance can be obtained by omitting a reflective coating for the surface of a specific sector, such as the non-reflective portion 166 between the areas 163 and 164 of the cone 160. In addition, a non-reflective coating can be applied to portion 166 to completely eliminate the light from a portion of the reference plane.

Figure 13:
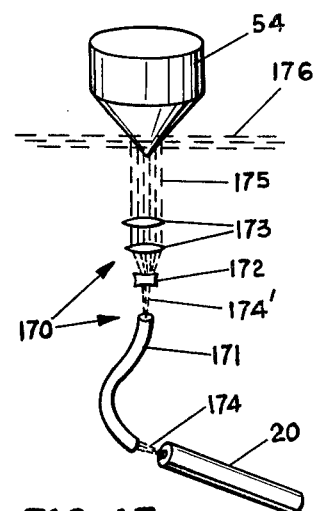
FIG. 13 is a diagrammatic perspective view of a fiber-optic transmission system conveying uncollimated radiation from a beam source of electromagnetic radiation to a collimation system which delivers the collimated beam to a convexly reflecting cone as the reference plane conversion means.

A fiber-optic system 170, which is shown in FIG. 13, comprises a source of high-intensity illumination 21, such as a laser, emitting a beam 174 which enters a fiber-optic tube 171 and leaves as light beam 174' to enter the diffraction lens 172 and the refraction lens 173, emerging as the expanded collimated beam 175 which impinges upon the apex of the cone 54, thereby being converted into the radially diverging plane 176.

Figure 14:
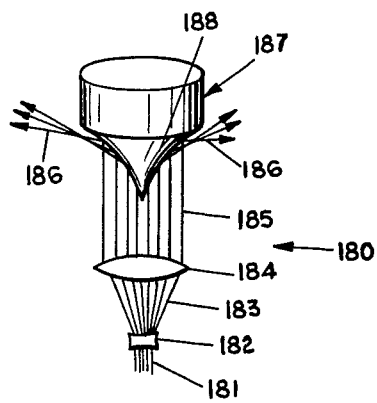
FIG. 14 is a diagrammatic perspective view of a convexly reflecting cone having a concave conical surface which transforms an expanded beam of diffusely collimated light into a difuse, thick, dished plane or shallow cone projecting forwardly or rearwardly, as desired.

The reference plane can be formed in numerous ways. FIG. 14 shows another manner in which the reference plane can be formed. In FIG. 14, reference plane system 180 comprises a diffraction lens 182, a refraction lens 184, and a curved surface cone 187 whose reflecting surface 188 is uniformly concave. A light beam 181 passes through the diffraction lens 182 to become the expanding beam 183 and then passes through the refraction lens 184 to make a substantially collimated beam 185. The broad beam 185 then is reflected into a system of rays 186 which form a cone having considerable cross-sectional thickness at the cone but the rays 186 tend to converge and form an annular ring having a relatively narrow width at a selected distance from the cone. The reference plane is thus formed at the selected distance where the rays converge.

Figure 15:
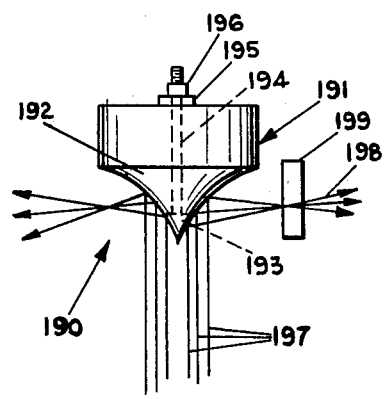
FIG. 15 is a side elevational view of a reflecting cone having a concave conical surface which is flexible and equipped with an altitude-changing means whereby the generated plane having sharply focused edges may be selectively disposed forwardly, perpendicularly, or rearwardly.

A variable concavity, curved surface, reference plane conversion assembly 190 for selectively adjusting the spot at which the reference plane is formed is shown in FIG. 15. The assembly 190 comprises a cone 191 having a concavely curved reflective surface 192 of a deformable material, such as polypropylene coated with aluminum. A plug 193 in the apex of the cone 191 is attached to a threaded rod which is axially disposed and passes through a washer 195 and a nut 196. Upon tightening or loosening the nut 196, the apex of the cone 191 is brought closer or farther away, respectively, from the backside thereof, thereby changing the concavity of the reflective surface 192. An incoming beam 197 strikes the curved reflective surface 193 and forms a family of emitted planar radiation 198 which creates a narrow focused ring at a surface 199 at a selected distance from the cone 191. By movement of the nut 196, the location of this narrow ring can be selectively altered and the forward or rearward inclination of the rays 198 can be changed to alter the distance from the cone 191 at which the ring is formed.

Figure 16:
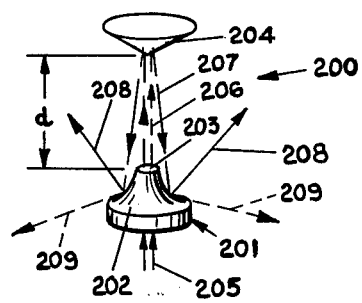
FIG. 16 is a diagrammatic perspective view of an alternate reference plane conversion system having opposed cones for producing variable cones.

Any combination of reflecting curved surfaces can be used to achieve the reference plane. An example of such a plurality of cones to form the reference planes is illustrated in FIG. 16 to which reference is now made.

A distance-variable planar diffusion assembly 200 comprises a hollow cone 201 and an obtusely reflecting cone 204, the cones 201, 204 being mutally opposed and axially aligned. The hollow cone 201 comprises a concave reflecting surface 202 and a hollow central portion 203. When a beam of electromagnetic radiation 205 passes through the hollow central portion 203, it impinges upon the apex of the cone 204 and is back-reflected toward the reflecting surface 202 which then reflects the beam again to form conically diverging rays 208 or 209. Rays 208 create a forwardly disposed cone and rays 209 form a rearwardly disposed cone. The reference plane can be obtained by intersecting the conical plane at a selected distance. The shape of the cone formed by the rays 208, 209 is determined by the distance $d$ between the cones 201, 204 as well as the curvature of the cones 201 and 204. At a given distance $d$, a flat plane perpendicular to the beam 205 will result.

Figure 17:
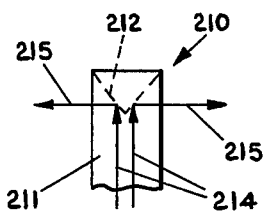
FIG. 17 is a side view of a transparent, solid tube into the receiving end of which a concave reflecting cone has been drilled.

By using a solid, transparent transmission tube for the beam of electromagnetic radiation, an extremely compact assembly can be constructed. As shown in FIG. 17, such an assembly comprises a solid transparent tube 211 having a concave cone with reflective surfaces 212 excised from, as by drilling, the emission end thereof. This concave cone device 210 enables a beam of electromagnetic radiation 214 to be converted into a peripherally diverging plane 215. Desirably a film of reflective material is deposited on the conical surfaces 212 to enhance reflectivity thereof.

This concave cone device 210 is highly rugged but extremely simple to manufacture and care for, It is potentially light in weight and can be combined with fiber-optic transmission systems having all the flexibility, versatility and multitudinal uses which have already been explored for such systems.

Figure 18:
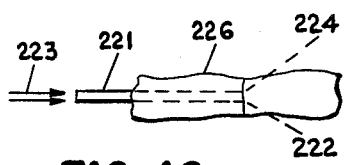
FIG. 18 is a side view of a section of an artery through which a fiber optical tube, having a beam-to-plane conversion cone at the end thereof, is inserted, thereby projecting a plane which sharply illuminates the sides of the artery.

An example of a fiber-optic transmission system is shown in FIG. 18. A fiber-optic tube 221 is inserted into a vein or artery whose wall 226 surrounds the tube 221. When a beam of light 223 passes through the tube 221 and is reflected by the cone 222, a plane 224 is emitted which strikes the walls of the wall 225 and creates a sharply defined circumferential line.

As is clearly apparent from the foregoing discussion, the collimation and monochromaticity requirements for an incoming beam of electromagnetic radiation, such as visible light, to be used for this invention may vary widely, depending partly upon magnification needed for a particular use, as can be estimated by dividing the diameter of the desired plane by the diameter of the reflecting cone approximately midway of the lighted zone thereon from the apex. The problem, as in microscopy, becomes a matter of resolution, and light intensity where a reflected plane is to be utilized. Because the available light at the edge of a reflected plane varies inversely with the square of the distance from the cone, additional diminution of light intensity caused by broadening of the plane must obviously be avoided. Such broadening can be created by lack of collimation and by non-uniformity of wavelength, as with white light. Consequently, uniformity of wave length and parallelism of the incoming light beam (i.e., collimation) can become significant if magnification requirements are demanding. Alternately, forcusing of the reference plane at a desired distance as illustrated in FIGS. 14 and 15 can be employed to achieve a sharp thin reference line at a distance.

Because a laser beam is inherently monochromatic and is approximately collimated, it is satisfactory for many uses without further apparatus combinations, but a laser beam may require expansion and collimation, as with a commercially available optical collimator or the lenses 131, 132 shown in FIG. 8, to make a beam of sufficient diameter so that the resulting plane will be large enough to see at a distance. For other uses, on the other hand, a laser beam is satisfactory without further collimation. For such uses as inspecting small diameter tubes, smaller diameter light beams will be adequate, or the beam can be focused if it is desirable that the reflected plane have considerable thickness or be forwardly or rearwardly disposed.

The invention has been described with respect to a system wherein a beam of light has its central axis aligned with the optical axis of a cone. However, the system is operable in instances wherein the optical axis of the reflecting cone is slightly displaced from but parallel to the axis of the beam. In such instances, the beam is reflected into a plane but the plane is only partial. In other words, the reference plane will eminate from only one side of the cone as compared with 360° as illustrated in FIGS. 1 and 2, for example. In addition, the axis of cone or reflecting surface can have its axis tilted with respect to the axis of the incident beam. In such case the reflected plane will not be perfectly flat.

The reflecting cones can be made of any suitable material which is capable of being optically polished to a high degree of accuracy. In addition, such material should be capable of receiving a mirrored surface coating, if necessary, for optimum reflectance. Suitable material includes glass, plastics, such as acrylics, and aluminum, the latter of which may not require reflective coating. Desirably, the cones are made in a conical or truncated conical shape with the cone surface being continuously curved. However, the cone can also be made in sections, as illustrated in FIG. 12, and the sections can have flat faces so that the conical surface is made of multiple faces.

Electromagnetic radiation in the form of a thin radially diverging reference plane as produced by this invention has many uses, such as vertically and/or horizontally disposed reference planes in building construction, bridge construction, and heavy equipment installation. In the construction industry, such a plane is useful for establishing datum points and level lines, either horizontal or vertical, which are needed for constructing floors, ceilings, or curtain and exterior walls and the like. In bridge construction, tunnel boring, and highway construction, for example, a constantly available datum plane is often needed for constructing piers, laying grades, and building drainage systems and the like. Precisely defined reference planes which are disposed at selected angles, longitudinally or transversely, are valuable for installing heavy machinery. Tubular inspection systems, which can be selectively combined with a camera means, are useful for checking pipe lines, carrying water, sewage, oil, natural gas, and the like. Such plane-emission systems for tubular inspection additionally have many applications in medical diagnosis and treatment involving veins and arteries in the human body. The reference planes in most cases will be used only with the human eye. However, aids such as photosensitive or photo electric sensors, targets, etc. can be used in areas where the light is difficult to see. In other instances, sighting back on the reflector with the human eye will establish the location of the reference plane.

Reasonable variation and modification are possible within the scope of the foregoing disclosure, the drawings, and appended claims without departing from the spirit of the invention.

The embodiments of the invention in which an exclusive property or privilege is claimed are defined as follows:

1. An apparatus for simultaneously converting a narrow highly collimated beam of electromagnetic radiation into a thin reference plane of electromagnetic radiation for measurements perpendicular to the plane, for aligning equipment and for guiding construction equipment, said apparatus comprising:

means for generating a narrow highly collimated beam of electromagnetic radiation and for directing said collimated beam in a particular orientation;

external surface reflector means for dispersing said collimated beam simultaneously into a thin plane of a substantially uniform, multitudinous array of radially diverging radiation forming a thin reference plane at a distance from said reflector means; and means for mounting said reflector means in a position operably aligned with said collimated beam so that said collimated beam is simultaneously reflected into a substantially uniform reference plane of electromagnetic radiation, said reference plane being of a thickness and character to permit detection and measurement from equal datum positions in the plane in a direction perpendicular to said plane.

2. An apparatus according to claim 1 wherein said reflecting means is a cone with an outer conical reflecting surface, the optical axis of said cone is parallel to or coincidental with the axis of said collimated beam, and said cone is nonrotatably fixed with respect to said radiation generating means.

3. An apparatus according to claim 2 wherein said optical axis is coincidental with the central axis of said collimated beam.

4. The apparatus of claim 3 wherein said cone is provided with an outer mirror surface.

5. An apparatus according to claim 3 wherein said collimated beam is a laser beam.

6. An apparatus according to claim 5 and further comprising a donut mode laser generator for generating said laser beam whereby said laser beam is substantially annular or donut shaped in cross-section.

7. An apparatus according to claim 6 wherein said cone is truncated, and said collimated beam is of sufficient diameter to impinge upon reflective portions of said truncated cone to produce said reference plane.

8. An apparatus according to claim 2 and further comprising a multimode laser generator and said collimated beam is a multimode laser beam.

9. An apparatus according to claim 1 and further comprising portable means for adjustably supporting said generating means so that said generating means can be selectively positioned in a given location and said collimated beam can be directed in a particular orientation, and wherein said reflector mounting means mounts said reflector means on said portable support means for said generating means.

10. An apparatus according to claim 9 wherein said portable support means for said generating means includes means for leveling said generator means so that said generator means directs said collimated beam into a predetermined orientation with respect to a horizontal datum plane.

11. An apparatus according to claim 1 and further comprising means intercepting said beam of electromagnetic radiation to focus said reference plane at a predetermined distance from said reflector means.

12. An apparatus according to claim 11 wherein said focusing means includes a concavely curved reflecting surface and forms said reflecting means.

13. An apparatus according to claim 12 wherein said planar focusing means comprises at least one hollow cone and an obtusely reflecting cone which are in axial alignment and are disposed in mutually opposed relationship.

14. An apparatus according to claim 1 wherein said reflector means includes a cone with sections thereof having nonreflective surfaces.

15. An apparatus according to claim 1 wherein said reflector means comprises a solid transparent tube having a conical reflective surface formed in one end thereof, and said collimated beam is transmitted through said transparent tube and is reflected by the surface of said conical cavity.

16. An apparatus according to claim 15 wherein said transparent tube is a fiber-optic tube.

17. An apparatus according to claim 1 wherein said reflector means forms a reference plane with a thickness of less than one inch at said distance from said reflector means.

18. A construction tool for use in establishing or marking lines in a predetermined datum plane, said construction tool comprising in combination:
a narrow collimated laser beam generating source;
means for mounting said laser beam generating source;
means for directing said laser beam in a predetermined orientation with respect to a horizontal datum plane;
a reflecting cone having a reflecting surface at 45° to the axis thereof;
means for mounting said reflecting cone in axial optical alignment with said laser beam emitted from said laser beam source, whereby said laser beam is reflected from said reflecting cone in the form of a thin reference plane of laser light emanating from said reflecting cone.

19. A construction tool according to claim 18 wherein said laser beam source is mounted generally horizontally on said source mounted means and said laser beam source emits a horizontally directed beam; a selectively reflective mirror is disposed in the path of said beam at a 45° angle to said beam, thereby reflecting said horizontal beam in a predetermined direction perpendicular to said horizontally directed beam; said reflecting cone mounting means includes supports extending along the direction of reflection of said beam and aligned therewith, and said reflecting cone mounting means mounting said reflecting cone in a position nonrotatably fixed with respect to said laser beam, whereby said beam is reflected by said cone in the form of a reference plane of laser light parallel to the horizontally directed beam.

20. A construction tool according to claim 18 wherein said laser beam source is horizontally mounted on said source mounting means and said laser beam is emitted from said laser source in a horizontal direction; said reflecting cone mounting means is secured to said source mounting means to axially align said reflecting cone with the axis of said laser beam, whereby said laser beam is reflected by said reflecting cone to form a vertical reference plane of laser light.

21. A construction tool according to claim 18 wherein said laser source is a donut-mode laser generator and said laser beam has an annular or donut shape in cross-section.

22. A method for generating a thin reference plane for use as datum lines or planes in constructing walls, ceilings, floor, alignment of equipment, etc., said method comprising the steps of:
generating a narrow highly collimated beam of electromagnetic radiation;
reflecting said narrow beam of radiation from an external reflector to disperse said beam simultaneously into a thin plane of substantially uniform multitudinous array of diverging rays of negligible thickness which form a usable reference plane at a distance from said reflector where said plane is to be used;
said reference plane being of a nature which is useful in establishing datum lines or planes at said distance from said reflector.

23. A method according to claim 22 and further comprising the step of focusing said reference plane into said thin plane at a predetermined distance from said reflector.

24. A method according to claim 22 and further comprising the step of detecting said reference plane at said distance from said reflector and using said detected reference plane as a reference at said distance.

25. A method according to claim 24 wherein said detecting step includes sighting back at said reflector.

26. A method according to claim 24 wherein said detecting step includes observing the impingement of the plane on a target.

27. A method according to claim 24 wherein said detecting step includes photoelectrically sensing said reference plane at said distance.

28. A method according to claim 22, wherein said collimated beam is a laser beam.

29. A method according to claim 28, wherein the reflector is a conical surface whose axis is optically aligned with the axis of the collimated beam.

30. A method according to claim 29, wherein the beam is a donut mode laser beam having a hollow or donut shape in cross section.

31. A method according to claim 30 wherein the reference plane has a thickness of less than one inch at said distance from the reflector.

32. A device for converting a laser beam into a plane of laser light for use as a reference plane in controlling equipment such as earth moving machines, comprising a laser source providing a collimated laser beam, a right circular conical reflecting surface having an external reflecting surface, said conical reflecting surface being arranged in the path of the laser beam so that said right circular conical reflecting surface converts said collimated laser beam into a plane of light.

33. A device according to claim 32, wherein said conical reflecting surface is arranged on the axis of said collimated laser beam to provide a light plane extending from the device through an angular range of 360°.

34. A device according to claim 33, wherein said conical reflecting surface is adjustably mounted with respect to said axis of said collimated laser beam to enable adjustment of the inclination between the axis of said conical reflecting surface and said axis of said collimated laser beam to vary the inclination of the light plane with respect to said axis of said collimated laser beam.

35. A device according to claim 33 wherein said conical reflecting surface is provided by a glass cone with a mirrored outer circumference.

36. A device according to claim 35, wherein said glass cone forming said conical reflecting surface is adjustably mounted with respect to said collimated laser beam to enable adjustment in the inclination between the axis of said glass cone and said axis of said collimated laser beam to adjust the inclination of the plane of laser light with respect to said axis of said collimated laser beam.

37. A device according to claim 32, wherein said conical reflecting surface is provided by a glass cone with a mirrored outer circumference.

38. A device according to claim 37, wherein said glass cone is adjustably mounted with respect to the axis of said collimated laser beam to enable adjustment in the inclination between the axis of said glass cone and said axis of said collimated laser beam to adjust the inclination of the plane with respect to said axis of said collimated laser beam.

39. A device according to claim 32, wherein said conical reflecting surface is adjustably mounted with respect to said collimated laser beam to enable adjustment in the inclination between the axis of said conical reflecting surface and the axis of the laser beam to vary the inclination of the light plane with respect to said axis of said collimated laser beam.

40. A device according to claim 32, wherein said conical reflecting surface is formed by a glass cone with a mirrored outer circumference, said glass cone being mounted with its axis coaxial with the axis of said collimated laser beam to provide a light plane extending 360° from the device with substantially equal intensity.

* * * * *